(12) United States Patent
Kjær et al.

(10) Patent No.: US 11,125,209 B2
(45) Date of Patent: Sep. 21, 2021

(54) CONTROLLING A WIND TURBINE DURING A LOW VOLTAGE GRID EVENT USING MPC

(71) Applicant: VESTAS WIND SYSTEMS A/S, Aarhus N (DK)

(72) Inventors: Martin Ansbjerg Kjær, Harlev J (DK); Tobias Gybel Hovgaard, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 294 days.

(21) Appl. No.: 16/097,675

(22) PCT Filed: May 2, 2017

(86) PCT No.: PCT/DK2017/050134
§ 371 (c)(1),
(2) Date: Oct. 30, 2018

(87) PCT Pub. No.: WO2017/190744
PCT Pub. Date: Nov. 9, 2017

(65) Prior Publication Data
US 2020/0362817 A1    Nov. 19, 2020

(30) Foreign Application Priority Data

May 3, 2016    (DK) .............................. PA 201670288

(51) Int. Cl.
*F03D 7/02* (2006.01)
*F03D 7/04* (2006.01)
*F03D 9/25* (2016.01)

(52) U.S. Cl.
CPC ........... *F03D 7/0284* (2013.01); *F03D 7/045* (2013.01); *F03D 9/255* (2017.02);
(Continued)

(58) Field of Classification Search
CPC ........ F03D 7/0284; F03D 7/045; F03D 9/255; F05B 2270/1033; F05B 2270/1071;
(Continued)

(56) References Cited

U.S. PATENT DOCUMENTS 8,866,323 B2 * 10/2014 Nielsen .................... H02J 3/381
290/44
9,088,179 B2 * 7/2015 Shaffer ............. H02J 13/00017
(Continued)

FOREIGN PATENT DOCUMENTS

| CN | 101560950 A | 10/2009 |
|---|---|---|
| CN | 102301585 A | 12/2011 |

(Continued)

OTHER PUBLICATIONS

Danish Patent and Trademark Office First Techincal Examination for Application No. PA 2016 70288 dated Dec. 8, 2016.
(Continued)

*Primary Examiner* — Pedro J Cuevas
(74) *Attorney, Agent, or Firm* — Patterson + Sheridan, LLP

(57) ABSTRACT

A wind turbine system comprising a nacelle mounted on a tower, a rotor having a plurality of blades and a boundary layer control system configured to control airflow through blade surface openings in each of the blades. The wind turbine system includes a control system configured to: monitor an operational speed parameter of the wind turbine, and activate the boundary layer control system if it is determined that the operational speed parameter exceeds a predetermined speed parameter threshold; monitor tower motion and to activate the boundary layer control system based on a determination of excessive tower motion; monitor for a wind turbine shutdown condition, activate the boundary layer control system if it is determined that the
(Continued)

shutdown condition has been identified; monitor the aerodynamic loads on the blades, and activate the boundary layer control system based on a determination of excessive blade loads.

17 Claims, 4 Drawing Sheets

(52) U.S. Cl.
CPC ............... *F05B 2270/1033* (2013.01); *F05B 2270/1071* (2013.01); *F05B 2270/332* (2013.01); *F05B 2270/337* (2013.01); *F05B 2270/404* (2013.01)

(58) Field of Classification Search
CPC .......... F05B 2270/332; F05B 2270/337; F05B 2270/404
USPC ....................................................... 290/44, 55
See application file for complete search history.

(56) References Cited

U.S. PATENT DOCUMENTS

| | | | |
|---|---|---|---|
| 9,407,186 B2* | 8/2016 | Babazadeh | H02J 3/16 |
| 9,556,852 B2* | 1/2017 | Babazadeh | H02J 3/386 |
| 9,709,034 B2* | 7/2017 | Kjær | F03D 7/0224 |
| 9,831,810 B2* | 11/2017 | Achilles | H02J 3/1842 |
| 10,352,301 B2* | 7/2019 | Gupta | H02J 3/386 |
| 10,704,534 B2* | 7/2020 | Biris | H02J 3/00125 |
| 10,760,547 B2* | 9/2020 | Howard | H02M 7/48 |
| 2012/0049516 A1* | 3/2012 | Viassolo | F03D 9/10 290/44 |
| 2014/0001758 A1* | 1/2014 | Nielsen | H02J 3/381 290/44 |
| 2014/0350743 A1* | 11/2014 | Asghari | G05B 13/048 700/297 |
| 2015/0249415 A1* | 9/2015 | Babazadeh | H02P 9/02 290/44 |
| 2015/0267686 A1* | 9/2015 | Kjær | F03D 7/0272 290/44 |
| 2015/0275862 A1* | 10/2015 | Babazadeh | H02J 3/386 290/44 |
| 2016/0268940 A1* | 9/2016 | Achilles | F03D 9/257 |
| 2017/0298904 A1* | 10/2017 | Nielsen | F03D 9/11 |
| 2017/0314534 A1* | 11/2017 | Gupta | H02J 3/16 |
| 2018/0119674 A1* | 5/2018 | Kjær | H02M 5/4585 |
| 2019/0093634 A1* | 3/2019 | Biris | H02J 3/381 |
| 2020/0191116 A1* | 6/2020 | Howard | H02P 21/22 |

FOREIGN PATENT DOCUMENTS

| | | |
|---|---|---|
| CN | 102725520 A | 10/2012 |
| CN | 102852716 A | 1/2013 |
| CN | 104242339 A | 12/2014 |
| CN | 104967377 A | 10/2015 |
| CN | 105156271 A | 12/2015 |
| CN | 105337415 A | 2/2016 |
| WO | 2011120523 A2 | 10/2011 |
| WO | 2012025120 A1 | 3/2012 |
| WO | 2016023560 A1 | 2/2016 |
| WO | 2016032815 A1 | 3/2016 |
| WO | 2017190744 A1 | 11/2017 |

OTHER PUBLICATIONS

PCT International Search Report for Application No. PCT/DK2017/050134 dated Aug. 23, 2017.
Arne Koerber et al: 11 Combined Feedback 1-12 Feed forward Control of Wind Turbines Using State-Constrained Model Predictive Contra 111 , IEEE Tran sa cti ons on Control Systems Technology, IEEE Servi ce Center, New York, NY, us, vol. 21, No. 4, Jul. 1, 2013.
Constantinos Sourkounis et al: "Grid Code Requirements for Wind Power Integration in Europe", Conference Papers in Energy, vol. 2013, Jan. 1, 2013.
PCT Written Opinion of the International Searching Authority for Application No. PCT/DK2017/050134 dated Aug. 23, 2017.
Chinese Office Action for Application No. 201780040476.X dated Mar. 19, 2021.

* cited by examiner

CONTROLLING A WIND TURBINE DURING A LOW VOLTAGE GRID EVENT USING MPC

FIELD OF THE INVENTION

The invention relates to control of a wind turbine in connection with a detected low voltage grid event where the grid voltage drop from a first level and to a second lower level.

BACKGROUND OF THE INVENTION

Utility grid companies set out the strategies and requirements for the connection of wind turbines to the utility grid. These connection requirements are described in so-called grid codes. The grid codes vary depending upon the geographical location of the utility grid.

One of the topics discussed in grid codes is the capabilities of a wind turbine when the utility grid experiences a fault, such as a low voltage event where the grid voltage drop from a first level and to a second lower level. One requirement may be that the wind turbine stay connected and synchronized to the utility grid during the grid fault, at least for some types of faults.

When a wind turbine experiences a low voltage event as a result of a fault of the utility grid, the torque on the generator is diminished and the generator speed increases almost immediately as a result of the excessive aerodynamic power that cannot be converted to electrical power. Therefore the aerodynamic power must be reduced drastically throughout the period of the utility grid fault. During the fault condition the turbine is operated in a fault mode often referred to as a low voltage mode.

Upon recovery of the utility grid, the wind turbine needs to recover from the fault mode and resume normal operation. In general there is a desire to bring the turbine back to normal operation as fast as possible, and in some grid codes there may even be set a hard limit to the time allowed for recovery. However, the speed at which the turbine can resume normal operation after a low voltage event is limited by load exposure of the tower, drive train, etc.

SUMMARY OF THE INVENTION

It would be advantageous to achieve a solution where after the grid event has ended, the wind turbine resumes normal operation in a fast manner in agreements with grid code requirements. In particular it is an object of the invention to provide a versatile solution which in a general manner can resume normal operation in a fast manner without exposing the wind turbine to excessive loads.

Accordingly, in a first aspect, there is provided a method of controlling a wind turbine connected to a utility grid, the method comprising:
  detecting a low voltage event where the grid voltage drops from a first level and to a second lower level;
  operating the wind turbine during the low voltage event in a grid event mode;
  detecting a termination of the low voltage event; and
  receiving a current operational state of the wind turbine; and receiving or determining a post event operational state; wherein
  based on the current operational state and the post-event operational state, calculate one or more predicted operational trajectories using a model predictive control (MPC) routine, the one or more predicted operational trajectories include a predicted control trajectory, where a trajectory comprises a time series of at least one variable;
  controlling the wind turbine using the control trajectory.

In the present invention, the operation of the turbine during the recovery mode is based on a calculated control trajectory. A trajectory is a time series of a variable for a given time slot, which includes the next variable value for the operational parameter related to the variable, as well as a predicted or an expected number of future variable values for the given parameter. For example, the control trajectory may be a pitch trajectory which includes the next pitch command, as well as an expected or a predicted number of future pitch commands.

Upon termination of the low voltage event, i.e. upon recovery of the utility grid, the one or more predicted operational trajectories are calculated by using a receding horizon control routine in the form of a model predictive control (MPC) routine. It is an advantage to calculate the control trajectory in the recovery mode using an MPC algorithm, since MPC algorithms are well suited for calculating an operational trajectory based on the actual state of the wind turbine. MPC algorithms take constraints on the system variables directly into account and can thereby advantageously be used to find optimal operational trajectories within safe operational limits, not just for the current control set-points but also for future set-points. In this manner it is possible to balance the load impact during the recovery process against the recovery time based on the actual state of the turbine as well as through-out the prediction horizon. In this manner, a fast recovery can be obtained within given load limits.

In an MPC control routine, the same overall implementation can be adapted to either give priority to recovery time or give priority to load handling by proper handling of constraints and cost function elements, and thereby allow for a general controller implementation which in a simple manner can be adapted to varying grid code requirements, as well as varying load exposures experienced by a given turbine, and which does not requires, or only requires minimal, tuning of the controller to a given situation.

In further aspects, the invention also relates to a computer program product comprising software code adapted to control a wind turbine when executed on a data processing system, to a control system for a wind turbine, and to a wind turbine being controlled in accordance with any of the various aspects of the present invention.

The computer program product may be provided on a computer readable storage medium comprising instructions to cause a data processing system, e.g. in the form of a controller, to carry out the instruction when loaded onto the data processing system.

The control system, the method of controlling and/or the computer program product may be at least partly implemented in wind turbine park controller which is arranged to control at least selected turbines of the wind turbine park. A wind turbine park controller may also be referred to as a power plant controller PPC.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
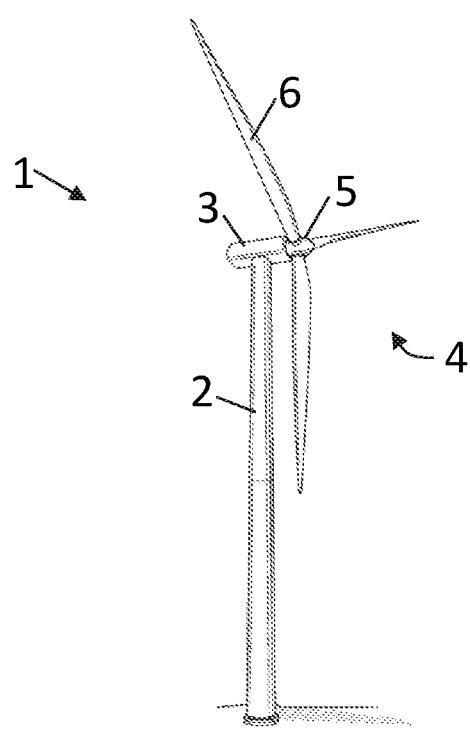
FIG. 1 illustrates, in a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected.

The wind turbine 1 may be included among a collection of other wind turbines belonging to a wind power plant, also referred to as a wind farm or wind park, that serves as a power generating plant connected by transmission lines with a power grid. The power grid generally consists of a network of power stations, transmission circuits, and substations coupled by a network of transmission lines that transmit the power to loads in the form of end users and other customers of electrical utilities. The wind power plant may comprise a power plant controller which may be in charge of controlling certain aspects of the individual turbines.

Figure 2:
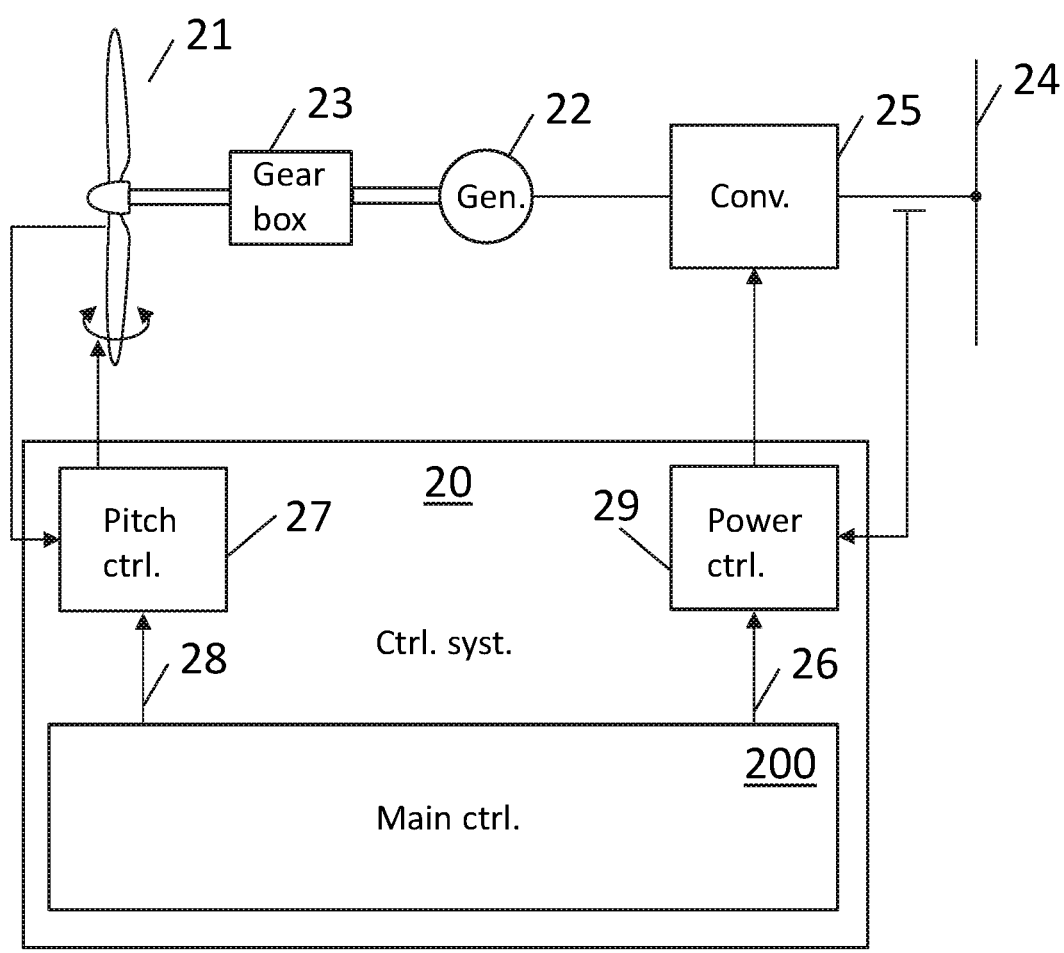
FIG. 2 schematically illustrates an embodiment of a control system together with elements of a wind turbine.

FIG. 2 schematically illustrates an embodiment of a control system 20 together with elements of a wind turbine. The wind turbine comprises rotor blades 21 which are mechanically connected to an electrical generator 22 via gearbox 23. In direct drive systems, and other systems, the gear box may not be present. The electrical power generated by the generator 22 is injected into a power grid 24 via an electrical converter 25. The electrical generator 22 and the converter 25 may be based on a full scale converter (FSC) architecture or a doubly fed induction generator (DFIG) architecture, but other types may be used.

The control system 20 comprises a number of elements, including at least one main controller 200 with a processor and a memory, so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades. The control system, or elements of the control system, may be placed in a power plant controller (not shown) so that the turbine may be operated based on externally provided instructions.

In embodiments of the invention, the control system, such as in the main controller 200, implements a model predictive control (MPC) routine which is programmed to receiving a current operational state of the wind turbine. Based on the current operational state, one or more predicted operational trajectories are calculated including at least one predicted operational trajectory, which normally at least includes pitch set-point 28 and a power set-point 29. The MPC may operate to handle specific control tasks, whereas as other control tasks are handled by a control loop feedback controller, such as a PID, PI, or similar, controller.

In a grid event in the form of a low voltage grid fault, power is lost in the grid 24, or at least drops significantly for a period of time.

Figure 3:
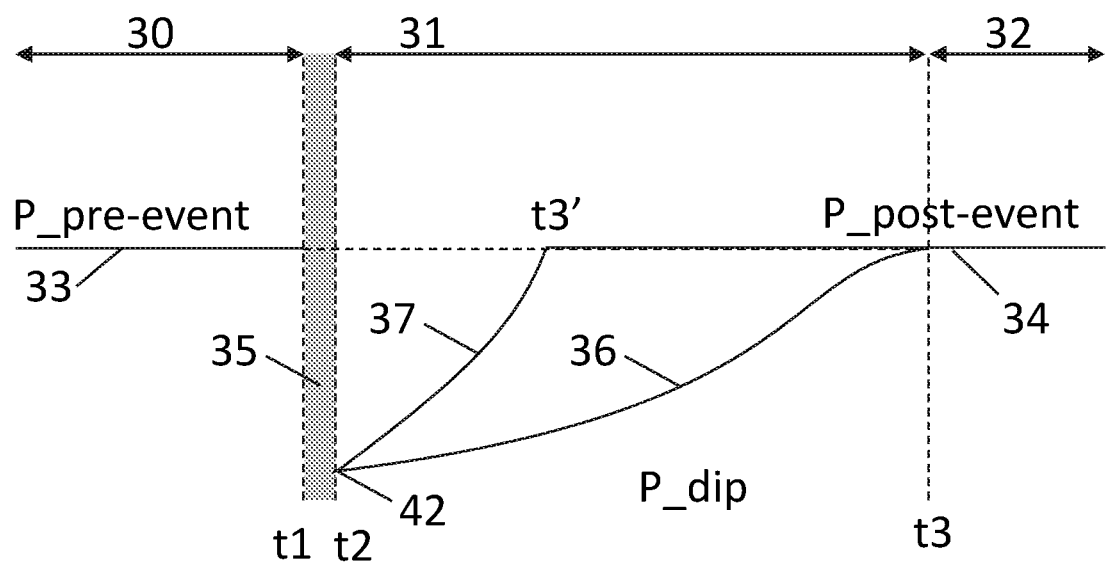
FIG. 3 shows two schematic examples of turbine operation in a low voltage event.

FIG. 3 shows two schematic examples of turbine operation in a low voltage event. In a pre-event situation 30 the power 33 is held at a given value (P_pre-event), which in a rated power situation may be a constant level. In a below rated situation, the output power 33 will follow the wind and not necessarily be constant in time. At t1 a grid event 35 occurs, and the grid voltage drops due to a grid fault, and at a time t2 the grid voltage is restored. The duration of the low voltage event depends on the nature of the fault, and may in a given situation be a few hundred milliseconds. During this period the turbine is operated in a grid event mode. Also the voltage drop, as well as the specific grid voltage during the event depends on the nature of the fault. In a given example, the grid power drops at least 60%, in some situations the grid power is lost during the event. During the grid event, the counter torque from the generator is lost, and the only actuator available to the controller is the pitch. The primary control objective during the grid event may be to control the pitch to keep the rotor speed below a certain limit.

At time t2, a termination of the low voltage event is detected by the wind turbine controller and the wind turbine enters the power recovery mode. In the power recovery mode a current operational state of the wind turbine together with a post-event operational state are determined or received. The post-event operational state is the desired operational state to which the wind turbine should recover, and in a simple example it is determined based on the current wind speed, however other internal and/or external parameters may be taken into account.

In FIG. 3, the post-event operational state is exemplified by the post-event power level (P_post-event 34). The post-event power level 34 is shown as a constant level. In a general situation it may be a moving target, since the power level may be based on the wind speed or any external set-points, such as derate set-points. In many situations, the duration of the power recovery period 31 is a few seconds, and the external conditions, such as wind speed, may not have changed much, and the wind turbine will return to a similar power level as the pre-event level.

Based on the current operational state and the post-event operational state, one or more predicted operational trajectories are calculated using a model predictive control (MPC) routine and the wind turbine is controlled during the recovery phase using the control trajectory.

While the prediction horizon of a MPC routine may cover the entire power recovery phase 31, in an embodiment, the one or more predicted operational trajectories are repeatedly calculated as receding horizon trajectories, and the wind turbine is controlled using the last calculated control trajectory. In this manner it is ensured that the actual condition of the wind turbine is continuously taken into account.

Figure 4:
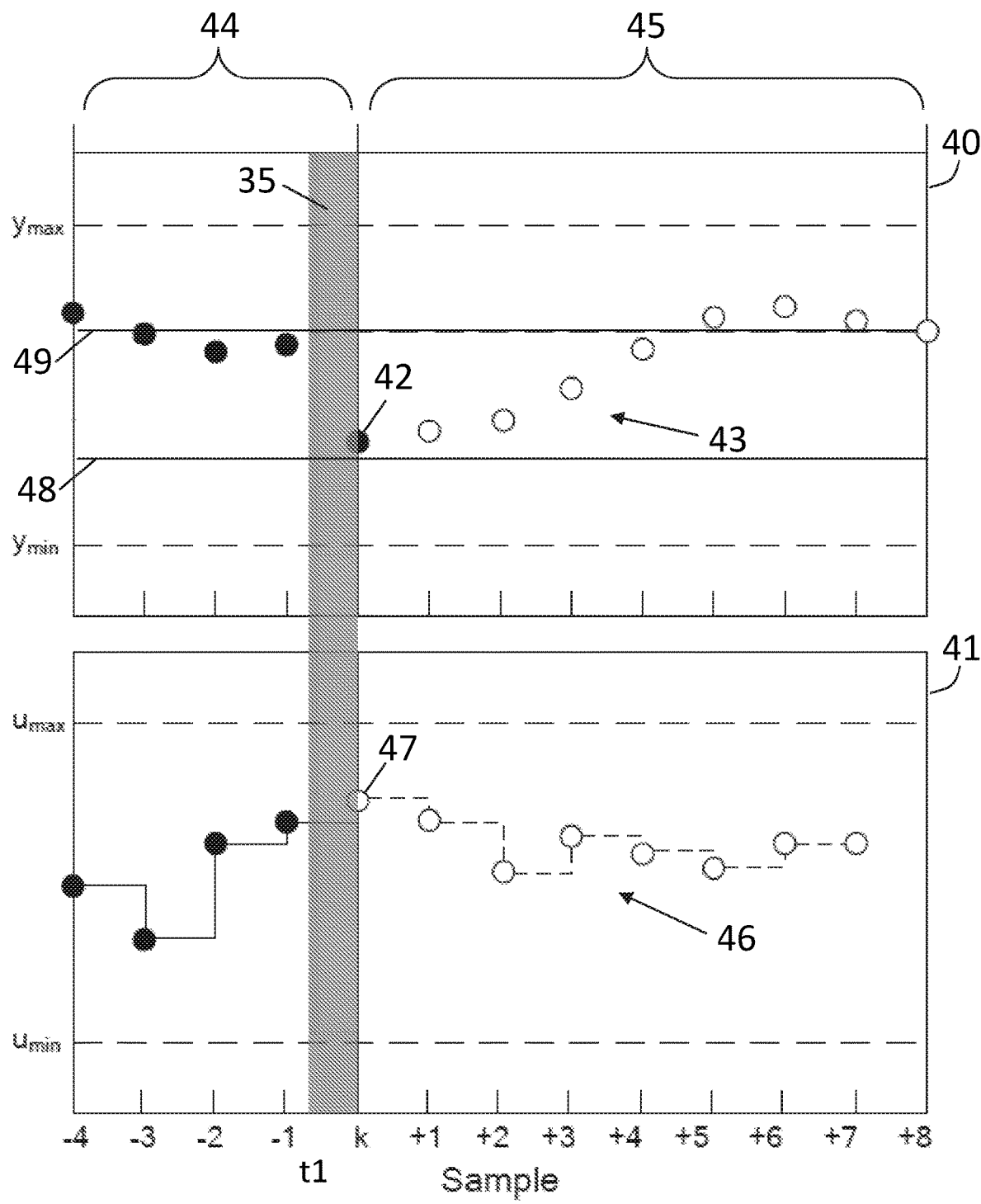
FIG. 4 shows general aspects of an MPC routine.

FIG. 4 shows general aspects of an MPC routine in relation to a measured operational variable y and an MPC calculated control variable u in a power recovery situation. The upper part 40 of the figure shows a state trajectory for the variable y and the lower part 41 of the figure shows a control trajectory for the control variable u.

The operational trajectories and control trajectories may include, but are not limited to, one or more of the following parameters: pitch value, including collective pitch values and individual pitch values, rotor speed, rotor acceleration, tower movement, power related parameters, torque related parameters and derivatives of these parameters, drive train related parameters, as well as to such parameters as generated power Pg, power extracted from the wind Pw, available power in the wind Pav, and the kinetic energy in the rotating system K.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \\ \kappa(t) \\ \dot{\kappa}(t) \end{bmatrix}$$

comprising pitch value, θ, rotor angular speed, ω, and tower top position, s, drive train torsion, κ, as well as time derivatives of those parameters. Other and more parameters may be used to define the wind turbine state, $x^*$.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g. in the form of a dedicated computational unit in charge of determining the current operational state, such as an observer or a Kalman filter.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal. Other and more parameters may be used to define the wind turbine control signal, $u_1^*$.

FIG. 4 shows a trajectory 43 of a measured variable y for a number of discrete time steps. The figure shows the current time, k, as well as a number of past time steps 44 and a number of future time steps 45 (also referred to as the prediction horizon and the control horizon for the state variable y and the control variable u, respectively). Known variable values, i.e. based on already measured values, are marked with a solid circle, whereas predicted variable values are marked with an open circle. A trajectory may comprise a time series of predicted values, i.e. only the open circles. The trajectory need not include the past and known values, but may do in certain embodiments. In particular, the current value 42 may be included for trajectories of measured variables. The trajectory may span a time series of a few seconds, such as 5-10 seconds. However the trajectory may be longer or shorter depending on the given implementation.

As an example, the trajectory shows the generated power, Pg, in a situation where a grid event 35 occurs at time t1, i.e. in a period before sample k. The trajectory shows the power level before the grid event and the selected lower power level 42 when the grid is restored, together with the predicted future power levels to reach a normal situation. Allowed maximum and minimum values are also shown for the illustrated variable.

FIG. 4 further illustrates an example of a general control trajectory 46 determined by use of an MPC algorithm. FIG. 4 illustrates the relationship between an operational state trajectory y, 43 and a general control trajectory u, 46.

While the current k-th value is known for measured variables 42, the current value 47 of the control trajectory is calculated by use of the MPC routine.

The figure also shows maximum and minimum allowed values for the control trajectory values of u.

As an example, the trajectory shows the trajectory for the pitch angle, i.e. u=θ. In the example the pitch angle is raised during the grid event, and is lowered afterwards as the turbine reach normal. The trajectory shows the next pitch setting 47 together with the predicted future pitch settings to fulfil the new set-point setting.

MPC is based on iterative, finite horizon optimization. At time t the current state is sampled and a cost minimizing control strategy is computed for a time horizon in the future: [t, t+T]. Only the first predicted value for the current sample k is used in the control signal, then the turbine state is sampled again and the calculations are repeated starting from the new current state, yielding a new control trajectory and new predicted state trajectory. The prediction horizon keeps being shifted forward and for this reason MPC is a receding horizon controller.

Model Predictive Control (MPC) is a multivariable control algorithm that uses an optimization cost function J over the receding prediction horizon, to calculate the optimal control moves.

The optimization cost function may be given by:

$$J = \sum_{i=1}^{N} w_{y_i}(r_i - y_i)^2 + w_{u_i}\Delta u_i^2$$

With reference to FIG. 4, $r_i$ is the set-point for the i-th variable 49, $y_i$ and $u_i$ being i-th trajectory variables, and $w_{y_i}$ being weight matrix defining the relative importance of this variable, and $w_{u_i}$ being weight matrix defining the penalty related to changes in this variable.

Returning to FIG. 3 the control routine used to control the turbine in normal operation 30, 32 may be based on feedback control, such as control loop PID control, whereas at least during the power recovery phase 31, the control is handled by an MPC control routine.

In an embodiment, also during the low voltage event, the wind turbine is controlled by use of classical feedback control, such as a control loop PID controller, a PI controller or similar. During the grid event, only the pitch angle is available as the controlled actuator and a fast and simple controller may be preferred. After the grid event has terminated, the dual objective is to get the turbine back to normal operation as fast as possible without exposing the turbine to excessive loads. Such multiple control objectives may advantageously be handled by an MPC routine.

In an embodiment to prepare the MPC to take over the control, an implementation may be used wherein during the low voltage event, the wind turbine is controlled by use of PID feedback control, and concurrently, based on the current operational state of the wind turbine, one or more predicted operational trajectories are calculated using the model predictive control (MPC) routine.

In an embodiment the MPC may take over the control also during the grid event, in such situation an implementation may be used wherein upon detection of the low voltage event, the current operational state of the wind turbine is received and based on the current operational state, calculate one or more predicted operational trajectories using a model predictive control (MPC) routine, the one or more predicted operational trajectories include a predicted control trajectory, and control the wind turbine using the control trajectory.

In an example embodiment, the optimization problem used for normal production has the form:

$$u^*(t) = \arg\min J_0(S(t), P(t), u(t)),$$

subject to a set of constraints.

Example constraints may be given in terms of such parameters as the rated rotor speed ($\omega_R$) should be below a given limit value $\Gamma_{\omega_R}$, and that pitch angle $\theta_i$ (with derivative) should be within given limit values for each blade i. Moreover, a constraint is set that the generated power Pg should be below the rated power Pr.

$$\omega_R \leq \Gamma_{\omega_R}$$

$$-5 \leq \theta_i \leq 90, i \in \{1,2,3\}$$

$$-20 \leq \dot{\theta}_i \leq 20, i \in \{1,2,3\}$$

$$P_g \leq P_r$$

The function argmin is the standard mathematical operator which stands for argument of the minimum, and finds points in the parameter space spanned by S, P, u and t where the cost function $J_0$ attains its smallest value.

Here, the nominal cost function $J_0$ provides a trade-off between power (P) and loads (5) using the control signal u(t), while the constraints limit the rotor speed, blade pitch angle, blade pitch speed, and electrical power. The control signal would typically consist of blade pitch angles and power reference for the converter:

$$u(t) = \begin{bmatrix} \theta_1(t) \\ \theta_2(t) \\ \theta_3(t) \\ P_{ref}(t) \end{bmatrix}$$

In embodiments, the MPC is in operation during the grid event, either in order to be ready to take over control upon recovery of the grid, or to control the turbine during the grid event.

In an embodiment, the power is constrained during the low voltage event in the model predictive control (MPC) routine to the measured power in the converter connected to the utility grid.

During the grid event, the MPC loses one of its control handles, namely the generator power. In such a situation the normal MPC problem can be slightly altered to obtain optimal operation in this new situation:

$$u^*(t) = \arg\min J_1(S(t), u(t)),$$

subject to the constraints:

$$\omega_R \leq \Gamma_{\omega_R}$$

$$-5 \leq \theta_i \leq 90, i \in \{1,2,3\}$$

$$-20 \leq \dot{\theta}_i \leq 20, i \in \{1,2,3\}$$

$$P_g = P_{g,measured}$$

In the above formulation, power is taken out of the trade-off in the cost function $J_1$ and the optimal control problem is solved with the constraint that the generator power must be equal to the actual measured values (likely to be zero).

By taking the generator power out of the optimal trade-off, the remaining concerns are loads, rotational speed and controller actuation while still respecting the original constraints, e.g. maximum rotational speed.

In FIG. 3, two power trajectories 36, 37 are shown for the power recovery phase 31. In one trajectory 36 the loads are prioritized over recovery time, whereas in the other trajectory 37 the recovery time is prioritized over loads, leading to an earlier recovery and thereby shorter recovery phase.

The two power trajectories illustrate example power value starting from a given power level at t2 until the resulting desired power level (P_post-event) is reached at either t3 or t3'. The start level 42 is typically set as a compromise between a level which is as high as possible to reduce the time it takes to get back to normal operation, but which is not so high that the load exposure becomes problematic high.

In an embodiment, the recovery time is prioritized in the optimization process. This may be obtained by imposing a maximal time to reach the post event operational state on the optimization process. This can be obtained by properly setting of constraint(s) on the recovery time.

In an example, a hard constraint is therefore set on the recovery time to ensure that the turbine is going to recover to nominal power within a hard time limit. In this case the cost function, $J_0$, will be unchanged. However, the term reflecting the loads, S, must obviously include all relevant loads. In particular tower extreme loads, tower oscillations, and drivetrain loads.

Two constraints may be added to the normal sat of constraints. One hard constraint:

$$P_g(t_2+t_3) \geq P_{nom}(v)$$

where $t_2$ is the time when the voltage returns, $t_3$ is the maximum recovery time specified in the grid code/requirements, $P_{nom}$ is the nominal steady state power as a function of the current wind speed, v.

As well as a soft constraint:

$$\kappa(t) \leq \kappa_{max} + \eta$$

limiting the drivetrain torsion to stay below the maximum level plus some slack, η. The size of the slack, η, is penalized in Sin order to keep $\kappa(t) \leq \kappa_{max}$ if at all possible.

The P term in the cost function may be weighted by zero during the recovery with this method as maximization of the generator power is not a goal in itself here as long as nominal power is reached within the given time limit.

In other embodiments, keeping loads below given limits are prioritized in the optimization process. This may be obtained by imposing a maximal load that cannot be exceeded in order to reach the post event operational state on the optimization process. This can be obtained by properly setting of constraint(s) on given loads.

In embodiments, the maximal load constraint may be set on at least one of tower extreme loads, tower oscillations, and drivetrain loads. Such constraints may be set on parameters which directly measure such loads, as well as on parameters which are indicative of these loads. The tower extreme loads may be constrained directly by setting a tower bending moment limit. However, since a turbine may not necessarily have a sensor to detect this directly, the constraint may be set on an observer which estimates the load. The same applies for other loads.

In an example, a constraint is set as a hard constraint on drive train torque. In this manner, when the voltage returns the turbine is going to recover to nominal power as fast as possible without violating the constraints. The structure of the cost function, $J_0$, will be unchanged. The set of constraints must include proper measures on load limits, such as maximum drivetrain torque and tower top deflection. A hard constraint may be added:

$$\kappa(t) \leq \kappa_{max}$$

By balancing the optimal trade-off between power, P, and loads, S, in the cost function, maximizing the generator power becomes the dominant objective (in the extreme, S is weighted by zero) and power will ramp up as fast as possible given that the constraints must be obeyed.

The objective is not directly related to recovery time but merely to the sum of generator power over the prediction horizon. Thus, an operational state which can be maintained also when the recovery phase ends, is achieved.

Figure 5:
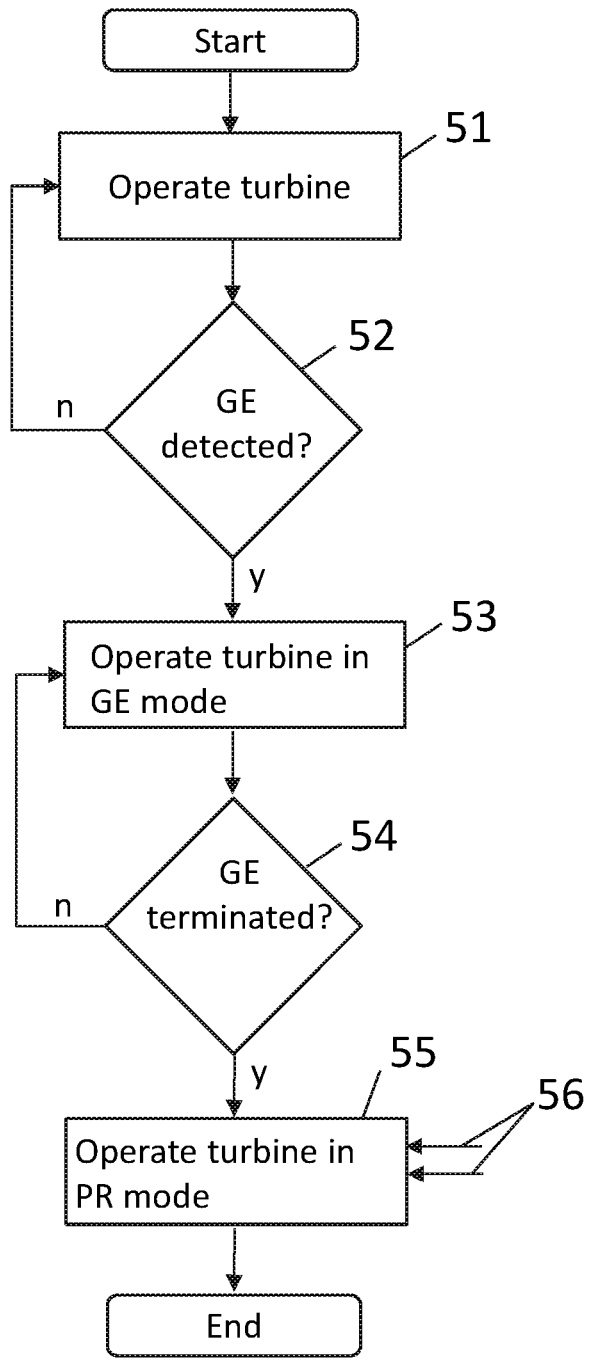
FIG. 5 illustrates elements of a flow diagram showing steps used to control a wind turbine to perform various embodiments of the present invention.

FIG. 5 illustrates elements of a flow diagram showing steps used to control a wind turbine to perform various embodiments of the present invention.

The elements may be implemented as a computer program product or code being adapted to generating instructions to a controller arranged to control the operation of the wind turbine or components of the wind turbine. The computer program may be provided in any suitable manner. The computer program product is typically stored by and executed by a wind turbine control system or by an external controller such as a power plant controller.

In a first step 51, the turbine is operated in a given mode, such as in a normal operation mode. The turbine is equipped with a detector for detecting 52 a grid event (GE) in the form of a low voltage event where the grid voltage drops from a first level and to a second lower level.

When a low voltage event has been detected the turbine is operated (53) in a grid event (GE) mode during the low voltage event. During the grid event, the turbine is arranged for detection when the grid event terminates (54), i.e. to detect a termination of the low voltage event.

Upon detection of the termination of the low voltage event, the turbine is operated in a power recovery (PR) mode (55). In the power recovery mode, the current operational state of the wind turbine and a post event operational state are determined or received (56). More input may be used. Based on the current operational state and the post-event operational state, one or more predicted operational trajectories, including a control trajectory, are calculated using a model predictive control (MPC) routine and control the wind turbine using the control trajectory.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of controlling a wind turbine connected to a utility grid, the method comprising:
   detecting a low voltage event where a voltage of the utility grid drops from a first level to a second lower level;
   operating the wind turbine during the low voltage event in a grid event mode;
   detecting a termination of the low voltage event;
   receiving a current operational state of the wind turbine;
   receiving or determining a post-event operational state;
   based on the current operational state and the post-event operational state, calculating one or more predicted operational trajectories using a model predictive control (MPC) routine with a maximal time to reach the post-event operational state as a constraint, the one or more predicted operational trajectories including a predicted control trajectory, where a trajectory comprises a time series of at least one variable; and
   controlling the wind turbine using the control trajectory.

2. The method according to claim 1, wherein the one or more predicted operational trajectories are repeatedly calculated as receding horizon trajectories, and wherein the wind turbine is controlled using the last calculated control trajectory.

3. The method according to claim 1, wherein during the low voltage event, the wind turbine is controlled by use of feedback control.

4. The method according to claim 1, wherein during the low voltage event, the wind turbine is controlled by use of feedback control, and concurrently, based on the current operational state of the wind turbine, one or more predicted operational trajectories are calculated using the MPC routine.

5. The method according to claim 4, wherein during the low voltage event, a power is constrained in the MPC routine to a measured power in a converter.

6. The method according to claim 1, wherein a maximal load is set as a constraint to reach the post-event operational state.

7. The method according to claim 6, wherein the maximal load constraint is set on at least one of tower extreme loads, tower oscillations, and drivetrain loads.

8. A control system for a wind turbine, comprising:
   a controller unit arranged for detecting a low voltage event where a grid voltage drops from a first level and to a second lower level;
   a controller unit arranged for operating the wind turbine during the low voltage event in a grid event mode;
   a controller unit arranged for detecting a termination of the low voltage event;
   a controller unit arranged for operating the wind turbine in a recovery mode, wherein the controller unit is arranged for receiving a current operational state of the wind turbine and receive or determine a post-event operational state;
   a controller unit arranged for, based on the current operational state and the post-event operational state, calculating one or more predicted operational trajectories using a MPC routine with a maximal time to reach the post-event operational state as a constraint, the one or more predicted operational trajectories including a predicted control trajectory, where a trajectory comprises a time series of at least one variable; and a controller unit capable of generating instructions for controlling the wind turbine based on the control trajectory.

9. The control system according to claim 8, wherein the one or more predicted operational trajectories are repeatedly calculated as receding horizon trajectories, and wherein the wind turbine is controlled using the last calculated control trajectory.

10. The control system according to claim 8, wherein during the low voltage event, the wind turbine is controlled by use of feedback control.

11. The control system according to claim 8, wherein during the low voltage event, the wind turbine is controlled by use of feedback control, and concurrently, based on the current operational state of the wind turbine, one or more predicted operational trajectories are calculated using the MPC routine.

12. The control system according to claim 8, wherein during the low voltage event, a power is constrained in the MPC routine to a measured power in a converter.

13. A wind turbine, comprising
a tower;
a nacelle disposed in the tower;
a rotor extending from the nacelle and having a plurality of blades disposed on a distal end thereof;
a control system configured to perform an operation, comprising:

detecting a low voltage event where a grid voltage drops from a first level and to a second lower level;
operating the wind turbine during the low voltage event in a grid event mode;
detecting a termination of the low voltage event;
receiving a current operational state of the wind turbine;
receiving or determining a post-event operational state;
based on the current operational state and the post-event operational state, calculating one or more predicted operational trajectories using a MPC routine with a maximal time to reach the post-event operational state as a constraint, the one or more predicted operational trajectories including a predicted control trajectory, where a trajectory comprises a time series of at least one variable; and
controlling the wind turbine using the control trajectory.

14. The wind turbine according to claim 13, wherein the one or more predicted operational trajectories are repeatedly calculated as receding horizon trajectories, and wherein the wind turbine is controlled using the last calculated control trajectory.

15. The wind turbine according to claim 13, wherein during the low voltage event, the wind turbine is controlled by use of feedback control.

16. The wind turbine according to claim 13, wherein during the low voltage event, the wind turbine is controlled by use of feedback control, and concurrently, based on the current operational state of the wind turbine, one or more predicted operational trajectories are calculated using the MPC routine.

17. The wind turbine according to claim 13, wherein during the low voltage event, a power is constrained in the MPC routine to a measured power in a converter.

* * * * *